2,821,018

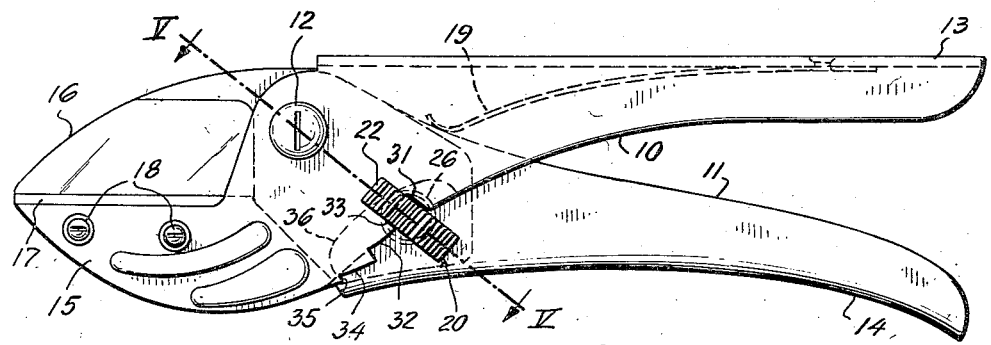

PRUNING CUTTERS

Archie M. Schwieso, Santa Cruz, Calif., assignor to H. Boker & Co., Inc., New York, N. Y., a corporation of New York Application April 4, 1957, Serial No. 650,648

5 Claims. (Cl. 30—186)

This invention relates to pruning cutters, and is shown applied in connection with pruning cutters of the nipper type wherein the sharp edge of one blade hits an anvil constituting the other blade.

Broadly stated, the invention contemplates provision of an improved catch for the jaws of pruning cutters.

More specifically, the invention provides an improved catch in combination with the jaws of the pruning cutters such that the opening of the jaws may be limited to one of a plurality of positions.

Furthermore the invention is directed to an improved catch in combination with the jaws of pruning cutters such that the catch functions either as a limitation to opening position of the jaws or to lock the jaws closed when so desired.

In greater detail, the invention provides a slidable catch the direction of sliding of which is transverse to the path of movement of the jaw members in the vicinity of said catch.

Another object of the invention is to provide a detent for the catch so arranged that the natural effort of the operator to shift the catch automatically releases said detent.

Yet another object of the invention is to provide a detent for the catch that remains fully effective and cannot be disturbed by the operation of the jaws during cutting use of the pruning cutters.

Still other objects, advantages and structural features of the invention will become apparent to persons skilled in the art to which the invention appertains as the description proceeds, both by direct recitation thereof and by implication from the context.

Referring to the accompanying drawing, in which like numerals of reference indicate similar parts throughout the several views;

Figure 1 is a side elevation of pruning cutters embodying the present invention, looking at the same at what will be arbitrarily termed the front side of the pruning cutters, and showing the jaws in their closed and locked position;

Figure 2 is a plan or top edge view of the pruning cutters in the position thereof as appearing in Fig. 1;

Figures 3 and 4 are front elevations similar to Fig. 1 and showing the jaws respectively at their intermediate or limited open position and at their wide open position as controlled by the appropriate adjustment or location of the catch;

Figure 5 is a sectional view taken on line V—V of Fig. 1;

Figure 6 is a sectional view taken on line VI—VI of Fig. 5;

Figure 7 is a perspective view of the detent male element of the catch;

Figure 8 is a view looking at what is arbitrarily termed the back of the pruning cutters and with a part of the back jaw member broken away in the vicinity of the catch; and Figure 9 is a partially diagrammatic view showing the relation of the catch and the several shoulders with which it functions in use.

In the specific embodiment of the invention illustrated in said drawing, the pruning cutters comprise crossed members 10, 11 pivoted where they cross in suitable manner as by the bolt, nut and washer assembly 12 fully shown in Fig. 5. At what will arbitrarily be called the rear end of the pruning cutters, said members are shaped to comprise handles or grip portions 13, 14 respectively. Utilizing corresponding arbitrary terminology, the forward ends of said members comprise jaws 15, 16 of which one, as 15, is provided with a removable anvil 17 retained in adjusted position by screws 18 so that the jaw 16 may make full line contact with said anvil when the jaws are moved to closed position. It will be understood that when the handles are closed toward each other, the jaws likewise close toward each other and that when the handles are spread apart, the jaws are similarly spread apart or opened. Any suitable spring loading may be provided, such as bar-spring 19 herein shown secured in handle 13 near the rear end thereof and bearing against handle 14 to the rear of pivot 12, the handles, and therefore the jaws, being thereby normally actuated toward open position.

An essential feature of the present invention is to selectively lock the jaws and handles in closed position or to permit opening to a full or to an intermediate position. For brevity, the portions of said members 10, 11 where crossed, may be referred to as the cheeks thereof. As a means for the selective locking and positioning feature just mentioned, a slidable catch 20 may be mounted on one member as 11, next to the cheek edge of the other member 10, and movable toward and away from that said cheek edge in a direction preferably aligned radially of the pivot 12.

Said catch comprises a stud-like device including a preferably square shank 21, on which, at what may be termed the upper end thereof, is a head 22 which projects at two opposite sides of the stud so that said head has an elongation in a direction transverse to the shank. One end of said head, which for convenience of identification will be termed the inner end, is made shallow enough to project over the cheek of front member 10. The other, or what will be termed the outer end of said head 22, projects outwardly over the cheek of the other member 11, and since that cheek is at a level behind the front cheek of member 10, said outer end of the head is thicker than the inner end commensurate with the thickness of said front cheek. At the far extremities of said head from the shank are provided rearwardly directed lips 23 which ride in engagement with the respective cheeks when the head is slid from one position to another.

It may now be pointed out that members 10 and 11 are each of channel formation longitudinally and that the jaw 16 has a flat shank portion 24 that lies between the flanges of the channel-shaped member 11 in contact with both of those flanges and rearwardly past the pivot 12 and past catch 20. Common to both of said flanges of member 11 and the interposed shank portion 24 of blade or jaw 16 is a slot 25 directed lengthwise toward pivot 12, said slot having appropriate width to have slidable fitting engagement with the shank 21 of the catch. The pivot 12 and shank 21 cooperate to keep jaw 16 from rotational shifting with respect to member 11. The length of said slot 25 is an important consideration and will be discussed more at length hereinafter at an appropriate part of this specification.

The rear end of shank 21 of catch 20 receives a screw 26 the head of which is preferably wider than said slot 25 and therefore capable of preventing displacement of the catch from said slot. Furthermore, said shank 21 has a length greater than the thickness of member 11 in vicinity of the slot, so that the shank projects at its rear from said member, and the screw head, when brought home against the end of said shank still leaves a space or gap between the rim of said head and adjacent face of said member. A resilient detent 27 occupies that space. Said detent is shown as approximately circular at its outer periphery and as having a square hole 28 which will slidably ride on the square shank 21 and thereby kept from rotating. It will also be noted that the detent has a diametric depressed burr 29 and that the halves of the detent on opposite sides of the burr slope upwardly in unrestrained condition, but in use are resiliently depressed by engagement of the head of screw 26 thereagainst. The resiliency of said detent functions to seat the stud head against the cheeks of members 10, 11 and also tends to seat said burr 29 in one of a series of kerfs 30 in the back face of member 11 adjacent and perpendicular to slot 25. It will be understood that the detent is placed on the shank 21 in such manner that the burr 29 will extend toward the adjacent member 11 and transverse to said slot 25.

The edge of the cheek of member 10 where overlapped by inner end of stud head 22 has steps at different radial distances from pivot 12. The step having the shortest radial distance $r_1$ (Fig. 9) from pivot 12 is preferably formed as a three-sided squared notch 31 of appropriate dimensions to receive a squared portion of catch stud shank 21 therein and in so doing preventing said member 10 from rotating in either direction with respect to the other member 11. Notch 31 is properly located so that when the stud shank is therein, the jaws are in closed position, and since the notch is a three-sided square, the said jaws will be locked in that closed position. It may now also be pointed out that the inward end of slot 25 substantially coincides with the bottom of said notch 31. It furthermore is pointed out that when said squared shank is located in said notch, detent burr 29 seats in the innermost one of kerfs 30, thereby releasably retaining the catch in its locking position.

The next step, designated 32, adjacent to notch 31, located a distance $r_2$ from the pivot 12 has no obstruction at its end toward the notch, but the riser 33 at the opposite end of said step constitutes a stop a distance $d_2$ from the notch preferably equal to the corresponding dimension of the shank. When the catch is slid outwardly away from the pivot sufficient distance to enable the shank to ride, when the members are rotated, a distance $d_2$ and thereby permits the jaws to be moved from closed position to an intermediate open position and vice versa. When the catch is in its position just described permitting riding of the stud shank over step 32, the burr 29 of the detent registers with and seats in another one of the kerfs 30. Consequently the pruning cutters may be used as long as desired with opening of the handles and jaws limited to the intermediate position established by the catch being stopped by riser 33. While I show one intermediate position, it will be understood that by use of appropriate spacing of steps and risers, and by corresponding location of kerfs, as many intermediate positions as desired may be provided.

In similar manner, a final step 34 at radius $r_3$ from the pivot may be provided and of appropriate length in a rotative direction to permit movement of the catch a distance $d_3$ from its position of registration with notch 31 through maximum displacement permitted by said final step. Each step is arcuate about the pivot axis, and therefore when the catch is set to one of its outward positions next to a step it may revolve about said pivot along said step, and with the revolution in a closing direction of the jaws, the stud shank will move in an arcuate direction along said step and then off of it to the final location opposite to the notch 31. With the catch slid as far away from the pivot as permitted by slot 25 the stud will be at a distance $r_3$ from the pivot and will not be interfered with by the intermediate riser 33 but can continue in movement to pass onto the final step 34. While eccentricity of the cheek edge may be utilized as the final stop, I have shown a riser 35 at the end of said final step 34 similar to stop 33 at the end of intermediate step 32. It should also be noted that a third kerf 30 of the series of kerfs is provided to retain the catch releasably at its outermost position so the catch will remain in its outermost position as long as it is desired to use the pruning cutters with maximum opening of the jaws with each stroke.

It is now appropriate to observe that the length of said slot 25 in a direction radially from the pivot 12 is properly proportioned to receive the stud therethrough and to afford the desired movement of the stud from its innermost position where seated in notch 31 to its outermost position where it will be free to pass over the several steps as the members are swung to maximum open position of the jaws. The construction furthermore permits releasable detention of the catch in any one of its several locations in the slot by means of burr 29 resiliently seating in the corresponding one of kerfs 30, thereby either retaining the catch shank seated in notch 31 to retain the jaws closed, or at an outward position at one of which the jaws may be opened only to an intermediate open relation or at another position at which the jaws may be operated to a maximum open position. The length of the head 22 of the catch is furthermore of appropriate dimension such that the innermost lip 23 thereof always over-rides the face of the adjacent member cheek at all slid positions of the catch, and the outermost lip similarly engages upon the other member cheek on which it rides at all slid positions of said catch and are never permitted to drop into the notch or into the slot in any position of the catch or of the members. Said lips are of limited area where bearing upon the respective members and therefore exert the same frictional contact at the several positions to which they are slid. The user, by thumb engagement with the outer knurled surface of the stud head 22 needs to exert only the same pressure and push on the head 22 for moving the stud from any position to another.

Finally, it may also be called to attention that the rear cheek of member 10 is bulged outwardly at 36 to overlie the screw 26 and detent 27 for protective purposes and to prevent inadvertent shifting of the catch as a result of engagement of the rear of the pruning cutters with some object.

I claim:

1. Pruning cutters having crossed members having cheeks where crossed, a pivot through said cheeks for permitting scissor-like movement of said members with respect to each other, one of said members having an edge overlying the other member and said edge having steps at different radial distances from said pivot in progressive succession one to the next, and the other said member having a slide catch mounted therein and overlapping said stepped member, said catch being selectively engageable with any one of said steps for imposing desired limitation of movement upon said members.

2. Pruning cutters in accordance with claim 1, wherein said slide catch has a resilient detent thereon for releasably locating the catch at its selected position.

3. Pruning cutters in accordance with claim 1, wherein said catch has a head with lips thereunder next to and in engagement with the respective members.

4. Pruning cutters in accordance with claim 1, wherein mounting for said slide catch comprises a slot in said other member extending longitudinally in a direction radially of said pivot, and wherein said catch provides a squared shank slidably engaging the sides of said slot and having movement lengthwise of said slot a distance at least equal to the cumulative depth of all of said steps.

5. Pruning cutters in accordance with claim 1, wherein the step nearest to said pivot comprises a notch for reception of said slide catch and by which when the catch is therein the members are prevented from movement in either direction.

No references cited.